United States Patent
Matsuo et al.

(10) Patent No.: US 10,510,495 B2
(45) Date of Patent: Dec. 17, 2019

(54) ELECTROCHEMICAL CAPACITOR

(71) Applicant: OSAKA SODA CO., LTD., Osaka (JP)

(72) Inventors: Takashi Matsuo, Osaka (JP); Masato Tabuchi, Osaka (JP); Hideaki Ueda, Osaka (JP); Katsuhito Miura, Osaka (JP)

(73) Assignee: OSAKA SODA CO., LTD., Osaka (JP)

( * ) Notice: Subject to any disclaimer, the term of this patent is extended or adjusted under 35 U.S.C. 154(b) by 34 days.

(21) Appl. No.: 15/563,177

(22) PCT Filed: Mar. 30, 2016

(86) PCT No.: PCT/JP2016/060391
§ 371 (c)(1),
(2) Date: Sep. 29, 2017

(87) PCT Pub. No.: WO2016/159078
PCT Pub. Date: Oct. 6, 2016

(65) Prior Publication Data
US 2018/0096800 A1    Apr. 5, 2018

(30) Foreign Application Priority Data

Mar. 31, 2015  (JP) ................................ 2015-071281

(51) Int. Cl.
| | | |
|---|---|---|
| *H01G 11/56* | (2013.01) | |
| *H01G 11/84* | (2013.01) | |
| *H01G 11/04* | (2013.01) | |
| *H01G 11/28* | (2013.01) | |
| *H01G 11/62* | (2013.01) | |

(52) U.S. Cl.
CPC ............ *H01G 11/56* (2013.01); *H01G 11/04* (2013.01); *H01G 11/28* (2013.01); *H01G 11/84* (2013.01); *H01G 11/62* (2013.01)

(58) Field of Classification Search
CPC ........ H01G 11/56; H01G 11/28; H01G 11/04; H01G 11/84; H01G 11/62
See application file for complete search history.

(56) References Cited

U.S. PATENT DOCUMENTS

| | | | |
|---|---|---|---|
| 2004/0076886 A1 | 4/2004 | Mori et al. | |
| 2006/0204854 A1* | 9/2006 | Fujimoto | C08J 5/20 |
| | | | 429/303 |
| 2008/0083626 A1 | 4/2008 | Kubo et al. | |
| 2018/0090282 A1* | 3/2018 | Matsuo | H01G 11/56 |
| 2018/0254152 A1* | 9/2018 | Matsuo | H01G 11/06 |
| 2018/0277313 A1* | 9/2018 | Tabuchi | C08G 65/22 |

FOREIGN PATENT DOCUMENTS

| | | | |
|---|---|---|---|
| JP | 8-107048 | 4/1996 | |
| JP | 2002-100404 | 4/2002 | |
| JP | 2003-147218 | 5/2003 | |
| JP | 2009-67774 | 4/2009 | |
| JP | 2013-175701 | 9/2013 | |
| WO | WO-2015163184 A1 * | 10/2015 | .............. B41M 1/06 |

OTHER PUBLICATIONS

International Search Report dated Jun. 14, 2016 in International (PCT) Application No. PCT/JP2016/060391.

* cited by examiner

*Primary Examiner* — Nathan Milakovich
(74) *Attorney, Agent, or Firm* — Wenderoth, Lind & Ponack, L.L.P.

(57) ABSTRACT

A low-cost electrochemical capacitor is provided which has high capacity and excellent charging and discharging characteristics, simultaneously has excellent safety and reliability, and has the basic performance as a capacitor, achieved in that, as the electrolyte between a negative electrode and a positive electrode, a solution of an ambient temperature molten salt and a specific polyether copolymer is allowed to gel using a specific photoreaction initiator and is held between the two electrodes. This low-cost electrochemical capacitor has the basic performance of a capacitor, has high capacity and excellent charging and discharging characteristics without use of a separator, and simultaneously has excellent safety and reliability.

9 Claims, No Drawings

ELECTROCHEMICAL CAPACITOR

TECHNICAL FIELD

The present invention relates to an electrochemical capacitor, and a gel electrolyte used therefor and a production method thereof. The present invention relates to an electrochemical capacitor which has a high energy density, which has a low internal resistance, can withstand a high voltage, and can rapidly charge and discharge at a large current, in a wide temperature range environment from a high temperature to a low temperature, and which can give a stabilized high power, and the present invention relates also to a gel electrolyte used therefor and a production method thereof.

BACKGROUND ART

Secondary batteries and electrochemical capacitors are actively developed as a main power source and an auxiliary power source of, for example, an electric vehicle (EV) and a hybrid electric vehicle (HEV), or as a power storage device of renewable energy such as solar power and wind power generation. An electric double-layer capacitor, a redox capacitor, a hybrid capacitor and a lithium ion capacitor are known as the electrochemical capacitors. The electric double-layer capacitor (sometimes referred to as "symmetric capacitor") uses a material having a large specific surface area such as an activated carbon for both of a positive electrode layer and a negative electrode layer. An electric double-layer is formed at an interface between the electrode layer and the electrolyte solution, and a power is stored by the non-faradaic reaction without reduction-oxidation. The electric double-layer capacitor generally has higher output density, and more excellent rapid charge/discharge characteristics in comparison to the secondary battery.

An electrostatic energy J of the capacitor is defined by the equation: $J=(\frac{1}{2}) \times CV^2$ wherein C is a capacitance and V is a voltage. The voltage of the electric double-layer capacitor is low such as 2.7 V to 3.3 V. Accordingly, the electrostatic energy of the electric double-layer capacitor is $\frac{1}{10}$ or less of the secondary battery.

The hybrid capacitor (sometimes referred to as "asymmetrical capacitor") is a capacitor in which a positive electrode layer and a negative electrode layer made of mutually different materials are opposed through a separator in an electrolyte solution containing lithium ions. With this construction, the electricity is stored by a non-faradaic reaction excluding an oxidation-reduction in the positive electrode layer, and the electricity is stored by a faradaic reaction including an oxidation-reduction in the negative electrode layer, so as to produce a large electrostatic capacitance C. Therefore, the hybrid capacitor is hoped to obtain a higher energy density in comparison to the electric double-layer capacitor.

However, since the electrochemical capacitors conventionally comprise a solution as the electrolyte from the viewpoint of ion conductivity, there is a risk of equipment damage due to a solution leakage. Accordingly, various safety measures are necessary to be an obstacle to the development of large capacitors.

Patent Document 1 proposes a solid electrolyte such as an organic polymer-based material. The solid electrolyte is advantageous in terms of safety without the liquid leakage problem, because the electrolyte in the form of the solid rather than the liquid is used as the electrolyte. However, there is a problem of lower ionic conductivity, and there is a problem of smaller static capacitance because of use of a separator.

Patent Document 2 proposes a capacitor wherein voids are formed by removing a salt of an ion exchange resin by using the ion exchange resin, and an electrolyte solution is filled into the voids. However, the capacitor cannot be easily produced, since the production is difficult because of necessity of the excessive step of producing the voids and the know-how is necessary for injecting the electrolyte solution into the voids.

Patent Document 3 proposes a gel electrolyte comprising a specific organic polymer electrolyte without using a separator to solve the above-mentioned problems. However, there is a margin for improvement in terms of film strength and reliability of the gel electrolyte.

PRIOR ARTS DOCUMENTS

Patent Documents

Patent Document 1: JP 2000-150308 A
Patent Document 2: JP 2006-73980 A
Patent Document 3: JP 2013-175701 A

SUMMARY OF THE INVENTION

Problems to be Solved by the Invention

In view of the above situations, the problems to be solved by the present invention is to provide an electrochemical capacitor which has basic performances to be possessed by capacitors, has high capacity, is excellent in charge/discharge characteristics, and is excellent in safety and reliability, without using a separator.

Means for Solving the Problems

The present inventors intensively studied to solve the above-mentioned problems and, as a result, discovered that an electrochemical capacitor which has basic performances to be possessed by capacitors, has high capacity, is excellent in charge/discharge characteristics, and is excellent in safety and reliability can be obtained by gelling a solution of a specific polyether copolymer and a electrolyte salt with using a specific photoreaction initiator to give an electrolyte and putting the electrolyte between both electrodes, thereby completing the present invention.

Item 1:
An electrochemical capacitor comprising:
a negative electrode,
a gel electrolyte composition which comprises an electrolyte salt and a gel of a crosslinked polyether copolymer having ethyleneoxide units, and
a positive electrode,
wherein a photoreaction initiator which crosslinks the polyether copolymer is an alkyl phenone photoreaction initiator.

Item 2:
The electrochemical capacitor according to Item 1, wherein the electrolyte composition contains an ambient temperature molten salt as the electrolyte salt.

Item 3:
The electrochemical capacitor according to Item 1 or 2, wherein the polyether copolymer having ethyleneoxide units comprises:

0 to 90% by mol of a repeating unit represented by the formula (A):

[Formula 1]

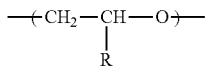
(A)

wherein R is an alkyl group having 1-12 carbon atoms, or —$CH_2O(CR^1R^2R^3)$,
in which each of $R^1$, $R^2$ and $R^3$ is a hydrogen atom or —$CH_2O(CH_2CH_2O)_nR^4$,
n and $R^4$ are the same or different among $R^1$, $R^2$ and $R^3$,
$R^4$ is an alkyl group having 1-12 carbon atoms, and
n is an integer of 0 to 12,
99 to 10% by mol of a repeating unit represented by the formula (B):

[Formula 2]

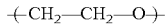 (B)

and,
0 to 15% by mol of a repeating unit represented by the formula (C):

[Formula 3]

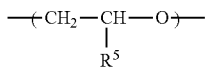
(C)

wherein $R^5$ is a group containing an ethylenically unsaturated group.

Item 4:
The electrochemical capacitor according to any one of Items 1 to 3, wherein the alkyl phenone photoreaction initiator is a mixture of a hydroxyalkyl phenone compound and an amino alkyl phenone compound.

Item 5:
The electrochemical capacitor according to any one of Items 1 to 4, wherein the addition amount of the photoreaction initiator is 0.1 to 10 parts by weight, based on 100 parts by weight of the polyether copolymer.

Item 6:
The electrochemical capacitor according to any one of Items 1 to 5, wherein the negative electrode comprises a mixture of a negative electrode active material, an electrically conductive aid and a binder, and the negative electrode active material is a graphite or an activated carbon.

Item 7:
The electrochemical capacitor according to any one of Items 1 to 6, wherein the negative electrode is doped with lithium.

Item 8:
The electrochemical capacitor according to any one of Items 1 to 7, wherein the positive electrode comprises a mixture of a positive electrode active material, an electrically conductive aid and a binder, and the positive electrode active material is an activated carbon.

Item 9:
The electrochemical capacitor according to any one of Items 1 to 8, wherein a thickness of a gel electrolyte composition layer comprising the electrolyte salt and the polyether copolymer having ethyleneoxide units, which is prepared by crosslinking and gelling, is 3 to 30 micrometers.

Item 10:
A method of producing an electrochemical capacitor comprising steps of:
crosslinking and gelling an electrolyte salt and a polyether copolymer having ethyleneoxide units in the presence of an alkyl phenone photoreaction initiator, to obtain a gel electrolyte composition, and
connecting a positive electrode and a negative electrode to the gel electrolyte composition.

Item 11:
A gel electrolyte composition for electrochemical capacitor, wherein an electrolyte salt and a polyether copolymer having ethyleneoxide units are crosslinked and gelled in the presence of an alkyl phenone photoreaction initiator.

Effect of the Invention

According to the present invention, the electrochemical capacitor which has a high electrostatic capacitance, is excellent in charge/discharge characteristics, and is excellent in safety and reliability can be obtained by gelling the solution comprising at least the electrolyte salt and the polyether copolymer having ethyleneoxide units as the electrolyte composition in the presence of a specific photoreaction initiator, and putting the gel between the negative electrode and the positive electrode. The electrolyte composition of the present invention has high ion conductivity and has high strength (high mechanical strength of a film).

Hereinafter, the constitutions of the present invention are explained in detail.

Examples of the electrochemical capacitor include an electrical double-layer capacitor, a redox capacitor, a hybrid capacitor and a lithium ion capacitor.

The electrochemical capacitor comprises an electrolyte composition (a gel electrolyte composition), a positive electrode, a negative electrode (for example, a electrical collector), and optionally a separator. The electrolyte composition is an un-crosslinked electrolyte composition or a gel electrolyte composition. The electrolyte composition is preferably a gel electrolyte composition.

The electrolyte composition is preferably in the form of a film or a layer.

In the method of producing the electrochemical capacitor, the step of obtaining the gel electrolyte composition may be performed simultaneously with the step of connecting the positive electrode and the negative electrode to the gel electrolyte composition.

MODES FOR CARRYING OUT THE INVENTION (Electrolyte Composition)

The polyether copolymer having ethyleneoxide units used in the electrolyte composition according to the present invention is a copolymer having, in a main chain or a side chain, a repeating unit of ethyleneoxide represented by the formula (B):

[Formula 4]

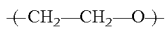 (B)

and, in the molecule, an ethylenically unsaturated group represented by the formula (C):

[Formula 5]

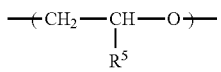

(C)

wherein $R^5$ is a group containing an ethylenically unsaturated group.

The polyether copolymer having ethyleneoxide units used in the present invention may optionally have a repeating unit represented by the formula (A):

[Formula 6]

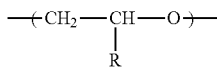

(A)

wherein R is an alkyl group having 1-12 carbon atoms, or $-CH_2O(CR^1R^2R^3)$,
in which each of $R^1$, $R^2$ and $R^3$ is a hydrogen atom or $-CH_2O(CH_2CH_2O)_nR^4$,
n and $R^4$ may be different among $R^1$, $R^2$ and $R^3$,
$R^4$ is an alkyl group having 1-12 carbon atoms, and
n is an integer of 0 to 12.

For example, a compound comprising repeating units of the formula (A), the formula (B) and the formula (C) used in the present invention is preferably a polyether copolymer prepared by polymerizing a monomer represented by the formula (1):

[Formula 7]

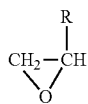

(1)

wherein R is an alkyl group having 1-12 carbon atoms, or $-CH_2O(CR^1R^2R^3)$,
in which each of $R^1$, $R^2$ and $R^3$ is a hydrogen atom or $-CH_2O(CH_2CH_2O)_nR^4$,
n and $R^4$ is the same or different among $R^1$, $R^2$ and $R^3$,
$R^4$ is an alkyl group having 1-12 carbon atoms, or an aryl group which may have a substituent, and
n is an integer of 0 to 12,
a monomer represented by the formula (2):

[Formula 8]

(2)

a monomer represented by the formula (3):

[Formula 9]

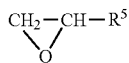

(3)

wherein $R^5$ is a group containing an ethylenically unsaturated group, or a crosslinked product of the polyether copolymer.

The compound of the formula (1) is available from a commercial product, or easily synthesizable from, for example, a generally known ether synthetic process from an epihalohydrin and an alcohol. Examples of the commercially available compound include propylene oxide, butylene oxide, methyl glycidyl ether, ethyl glycidyl ether, butyl glycidyl ether, t-butyl glycidyl ether, benzyl glycidyl ether, 1,2-epoxy dodecane, 1,2-epoxy octane, 1,2-epoxy heptane, 2-ethylhexyl glycidyl ether, 1,2-epoxy decane, 1,2-epoxy hexane, glycidyl phenyl ether, 1,2-epoxy pentane and glycidyl isopropyl ether. Among these commercial products, preferable products are propylene oxide, butylene oxide, methyl glycidyl ether, ethyl glycidyl ether, butyl glycidyl ether and glycidyl isopropyl ether, and particularly preferable products are propylene oxide, butylene oxide, methyl glycidyl ether and ethyl glycidyl ether.

In the monomer represented by the formula (1) obtained by synthesis, R is preferably $-CH_2O(CR^1R^2R^3)$, and at least one of $R^1$, $R^2$ and $R^3$ is preferably $-CH_2O(CH_2CH_2O)_nR^4$. Preferably, $R^4$ is an alkyl group having 1-6 carbon atoms, more preferably 1-4 carbon atoms. n is preferably 2 to 6, more preferably 2 to 4.

The compound of the formula (2) is a basic chemical product, and is easily available commercial product.

In the compound of the formula (3), $R^5$ is a substituent containing an ethylenically unsaturated group. Examples of the monomer component containing a ethylenically unsaturated group include allyl glycidyl ether, 4-vinylcyclohexyl glycidyl ether, alpha-terpinyl glycidyl ether, cyclohexenyl methyl glycidyl ether, p-vinylbenzyl glycidyl ether, allylphenyl glycidyl ether, vinyl glycidyl ether, 3,4-epoxy-1-butene, 3,4-epoxy-1-pentene, 4,5-epoxy-2-pentene, 1,2-epoxy-5,9-cyclododecanediene, 3,4-epoxy-1-vinylcyclohexene, 1,2-epoxy-5-cyclooctene, glycidyl acrylate, glycidyl methacrylate, glycidyl sorbate, glycidyl cinnamate, glycidyl crotonate and glycidyl 4-hexenoate. Allyl glycidyl ether, glycidyl acrylate and glycidyl methacrylate are preferable.

Each of the repeating units (A) and (C) may be derived from two or more of different monomers.

The polyether copolymer of the present invention can be synthesized as follows: A catalyst system based on organic aluminum, a catalyst system based on organic zinc, a coordination anion initiator such as an organotin-phosphate ester condensate catalyst system, or an anion initiator such as a potassium alkoxide, diphenylmethyl potassium and potassium hydroxide comprising $K^+$ as a counter ion is used as a ring opening polymerization catalyst so that the monomers are reacted at a reaction temperature of 10 to 120° C. with stirring in the presence or absence of a solvent, to obtain the polyether copolymer. From the viewpoint of, for example, a polymerization degree or properties of the obtained copolymer, the coordination anion initiator is preferable. Among them, the organotin-phosphate ester condensate catalyst can be easily handled and is particularly preferable.

The polyether copolymer of the present invention preferably consists of:
(i) the repeating unit (A)+the repeating unit (B),
(ii) the repeating unit (B)+the repeating unit (C), or
(iii) the repeating unit (A)+the repeating unit (B)+the repeating unit (C).

In the polyether copolymer of the present invention, a molar ratio of the repeating unit (A), the repeating unit (B) and the repeating unit (C) is preferably (A) 0 to 90 mol %, (B) 99 to 10 mol % and (C) 0 to 15 mol %, more preferably (A) 0.1 to 70 mol %, (B) 98 to 30 mol % and (C) 0.1 to 13 mol %, still more preferably (A) 1 to 50 mol %, (B) 98 to 50 mol % and (C) 1 to 11 mol %. If the repeating unit (B) exceeds 99 mol %, a rise of glass transition temperature and a crystallization of an oxyethylene chain are caused so that the ion conductivity of the electrolyte is remarkably worse. Although it is known that the ion conductivity will be generally improved by reducing the crystallinity of polyethylene oxide, the polyether copolymer of the present invention is remarkably excellent in this viewpoint.

In order that the polyether copolymer of the present invention can obtain good workability, mechanical strength and plasticity, a molecular weight of the polyether copolymer is preferably 10,000 to 2,500,000, more preferably 50,000 to 2,000,000, still more preferably 100,000 to 1,800,000.

The polyether copolymer before gelling according to the present invention may be any copolymerization type, such as a block copolymer and a random copolymer. Since the effect that the random copolymer reduces the crystallinity of polyethylene oxide is larger, the random copolymer is preferable.

The electrolyte composition according to the present invention comprises the electrolyte salt in the crosslinked product of the polyether copolymer. The electrolyte composition may be obtained by impregnating the crosslinked product with the electrolyte salt. Alternatively the electrolyte composition containing the electrolyte salt in the crosslinked product may be obtained by crosslinking the polyether copolymer which contains the electrolyte salt at the time the polyether copolymer is crosslinked.

The electrolyte composition of the present invention may be in the form of the polyelectrolyte gel produced from the polyether copolymer and the electrolyte salt in the presence of an aprotic organic solvent. In order to strengthen the gel, the electrolyte composition may be crosslinked and gelled by irradiating with an active energy ray such as an ultraviolet ray in the presence of a photoreaction initiator. By doing so, a special separator is not needed and the gel can act as a separator.

Examples of the active energy ray used for the crosslinking by light include an ultraviolet ray, a visible ray and an electron ray. The ultraviolet ray is particularly preferred, because of cost of devices and ease of control.

The alkyl phenone photoreaction initiator is used as the photoreaction initiator used in the present invention. The alkyl phenone photoreaction initiator is very preferred in view of a quick reaction rate and a low contamination into the electrolyte composition.

Specific examples of the alkyl phenone photoreaction initiator include:
a hydroxyalkyl phenone compound such as 1-hydroxy-cyclohexyl-phenyl ketone, 2-hydroxy-2-methyl-1-phenyl-propan-1-one, 1-[4-(2-hydroxyethoxy)-phenyl]-2-hydroxy-2-methyl-1-propan-1-one, 2-hydroxy-1-[4-[4-(2-hydroxy-2-methyl-propionyl)-benzyl]phenyl]-2-methyl-propan-1-one, 2,2-dimethoxy-1,2-diphenylethan-1-one; and
an amino alkyl phenone compound such as 2-methyl-1-(4-methylthiophenyl)-2-morpholinopropan-1-one, 2-(dimethylamino)-2-[(4-methylphenyl)methyl]-1-[4-(4-morpholinyl) phenyl]-1-butanone, 2-benzyl-2-dimethylamino-1-(4-morpholinophenyl)-butan-1-one. Specific examples thereof further include 2,2-dimethoxy-1,2-diphenylethan-1-one, phenyl glyoxylic acid methyl ester. Among them, preferable are 2-hydroxy-2-methyl-1-phenyl-propan-1-one, 1-[4-(2-hydroxyethoxy)-phenyl]-2-hydroxy-2-methyl-1-propan-1-one, 2-benzyl-2-dimethylamino-1-(4-morpholinophenyl)-butanone-1 and 2-(dimethylamino)-2-[(4-methylphenyl) methyl]-1-[4-(4-morpholinyl)phenyl]-1-butanone, because of a quick reaction rate and a low contamination into the electrolyte composition.

By using the combination of the hydroxyalkyl phenone compound and the amino alkyl phenone compound, a surface and an inside can be effectively polymerized in a wide wavelength range to increase the gelling strength. A weight ratio of the hydroxyalkyl phenone compound to the amino alkyl phenone compound may be 95:5 to 30:70, for example, 90:10 to 50:50, particularly 85:15 to 55:45.

Examples of another photoreaction initiator include benzophenones, acyl phosphine oxides, titanocenes, triazines, bisimidazoles and oxime esters. These reaction initiators may be added as an auxiliary initiator to the alkyl phenone photoreaction initiator.

The amount of the photoreaction initiator used for the crosslinking reaction may be 0.05 to 15 parts by weight, preferably 0.1 to 10 parts by weight, more preferably 0.1 to 4.0 parts by weight, particularly 0.15 to 3.0 parts by weight, based on 100 parts by weight of the polyether copolymer.

A crosslinking aid may be used together with the photoreaction initiator in the present invention. The crosslinking aid is usually a polyfunctional compound (for example, a compound comprising at least two $CH_2=CH-$, $CH_2=CH-CH_2-$, and/or $CF_2=CF-$). Specific examples of the crosslinking aid include triallyl cyanurate, Wallyl isocyanurate, triacrylformal, triallyl trimellitate, N,N'-m-phenylene bismaleimide, dipropargyl terephthalate, diallyl phthalate, tetraallyl terephthalamide, Wallyl phosphate, hexafluorotriallyl isocyanurate, N-methyl tetrafluoro diallyl isocyanurate, trimethylolpropane trimethacrylate, trimethylolpropane triacrylate, ethoxylated isocyanuric acid triacrylate, pentaerythritol triacrylate, ditrimethylolpropane tetraacrylate, polyethylene glycol diacrylate and ethoxylated bisphenol-A diacrylate. The amount of the crosslinking aid is preferably 0 to 5 parts by weight, more preferably 0.01 to 3 parts by weight.

The crosslinking reaction can be performed, in the case of the ultraviolet ray, by using a xenon lamp, a mercury lamp, a high pressure mercury lamp and a metal halide lamp. For example, the crosslinking reaction can be performed by irradiating with the electrolyte at a wavelength of 365 nm, and a light intensity of 1 to 50 mW/cm for 0.1 minutes to 30 minutes.

The electrolyte salt may comprise an ambient temperature molten salt (an ionic liquid). The effect as a generally used organic solvent can be demonstrated by using the ambient temperature molten salt as the electrolyte salt.

The ambient temperature molten salt means a salt at least a part of which exhibits a liquid at an ambient temperature. The ambient temperature means a temperature range which is assumed to be that a power supply usually operates. The temperature range assumed to be that a power supply usually operates has a maximum temperature of about 120° C., sometimes about 60° C., and a minimum temperature of about −40° C., sometimes about −20° C.

The ambient temperature molten salt is also called as "ionic liquid". A quarternary ammonium organic cation of pyridines, fatty amines and alicyclic amines is known as the ambient temperature molten salt. Examples of the quarternary ammonium organic cation include an imidazolium ion such a dialkyl imidazolium ion and a trialkyl imidazolium ion, a tetraalkyl ammonium ion, an alkyl pyridinium ion, a pyrazolium ion, a pyrrolidinium ion and a piperidinium ion. In particular, the imidazolium cation is preferable.

Example of the imidazolium cation includes a dialkyl imidazolium ion and a trialkyl imidazolium ion. Specific examples of the dialkyl imidazolium ion include a 1,3-dimethyl imidazolium ion, a 1-ethyl-3-methyl imidazolium ion, a 1-methyl-3-ethyl imidazolium ion, a 1-methyl-3-butyl imidazolium ion and a 1-butyl-3-methyl imidazolium ion, and specific examples of the trialkyl imidazolium ion include a 1,2,3-trimethyl imidazolium ion, a 1,2-dimethyl-3-ethyl imidazolium ion, a 1,2-dimethyl-3-propyl imidazolium ion and a 1-butyl-2,3-dimethyl imidazolium. The imidazolium cation is not limited to these examples. A 1-allyl imidazolium ion such as a 1-allyl-3-ethyl imidazolium ion, a 1-allyl-3-butyl imidazolium ion and a 1,3-diallyl imidazolium ion can also be used.

Examples of the tetraalkyl ammonium ion include a trimethyl ethyl ammonium ion, a dimethyldiethyl ammonium ion, a trimethyl propylammonium ion, a trimethylhexyl ammonium ion, a tetrapentyl ammonium ion and an N,N-diethyl-N-methyl-N-(2-methoxyethyl) ammonium ion. The tetraalkyl ammonium ion is not limited to these examples.

Examples of the alkyl pyridinium ion include an N-methyl pyridinium ion, an N-ethylpyridinium ion, an N-propylpyridinium ion, an N-butyl pyridinium ion, a 1-ethyl-2 methylpyridinium ion, a 1-butyl-4-methylpyridinium ion, a 1-butyl-2,4 dimethyl pyridinium ion and an N-methyl-N-propyl piperidinium ion. The alkyl pyridinium ion is not limited to these examples.

Examples of the pyrrolidinium ion include an N-(2-methoxyethyl)-N-methyl pyrrolidinium ion, an N-ethyl-N-methyl pyrrolidinium ion, an N-ethyl-N-propyl pyrrolidinium ion, an N-methyl-N-propyl pyrrolidinium ion and an N-methyl-N-butyl pyrrolidinium ion, and the pyrrolidinium ion is not limited to these examples.

The ambient temperature molten salt containing these cations may be used alone or in combination of at least two.

Examples of an anion include:
halide ions such as a chloride ion, a bromide ion and an iodide ion;
inorganic acid ions such as a perchlorate ion, a thiocyanic acid ion, a
tetrafluoroboric acid ion, nitrate ion, $AsF_6^-$ and $PF_6^-$;
organic acid ions such as a trifluoromethanesulfonic acid ion, a stearyl sulfonic acid ion, an octylsulfonic acid ion, a dodecylbenzenesulfonic acid ion, a naphthalenesulfonic acid ion, a dodecylnaphthalenesulfonic acid ion, a 7,7,8,8-tetracyano-p-quinodimethane ion, a bis(trifluoromethanesulfonyl)imide ion, a bis(fluorosulfonyl)imide ion, a tris(trifluoromethylsulfonyl)methide ion, a bis(pentafluoroethylsulfonyl)imide ion, a 4,4,5,5-tetrafluoro-1,3,2-dithiazolidine-1,1,3,3-tetraoxide ion, a trifluoro(pentafluoroethyl)boric acid ion and a trifluoro-tri(pentafluoroethyl) phosphoric acid ion.

Preferably, the electrolyte salt, which can be used in the present invention, is compatible with the mixture which comprises the polyether copolymer or the crosslinked product of polyether copolymer, and the ambient temperature molten salt (the ionic liquid). Herein, the term "compatible" means the state that the electrolyte salt compound is not precipitated by, for example, crystallization.

The electrolyte salt described below is preferably used in the present invention. That is, examples thereof include a compound comprising a cation selected from a metal cation, an ammonium ion, an amidinium ion and a guanidium ion, and an anion selected from a chloride ion, a bromide ion, a iodide ion, a perchlorate ion, a thiocyanate ion, a tetrafluoroborate ion, a nitrate ion, $AsF_6^-$, $PF_6^-$, a stearylsulfonate ion, an octylsulfonate ion, a dodecylbenzenesulfonate ion, a naphthalenesufonate ion, a dodecylnaphthalenesulfonate ion, a 7,7,8,8-tetracyano-p-quinodimethane ion, $X_1SO_3$—, $[(X_1SO_2)(X_2SO_2)N]^-$, $[(X_1SO_2)(X_2SO_2)(X_3SO_2)C]^-$ and $[(X_1SO_2)(X_2SO_2)YC]^-$, wherein $X_1$, $X_2$, $X_3$ and Y respectively represent an electron attractive group. Preferably, $X_1$, $X_2$ and $X_3$ independently represent a perfluoroalkyl group having 1 to 6 carbon atoms or perfluoroaryl group having 6 to 18 carbon atoms and Y represents a nitro group, a nitroso group, a carbonyl group, a carboxyl group or a cyano group. $X_1$, $X_2$ and $X_3$ may be the same or different.

A cation of a transition metal can be used as the metal cation. Preferably, the cation of the metal selected from Mn, Fe, Co, Ni, Cu, Zn and Ag metals is used. A preferable result is obtained also when using the cation of the metal selected from Li, Na, K, Rb, Cs, Mg, Ca and Ba metals. The electrolyte salt may be a combination of at least two of above-mentioned compounds. In particular, in a lithium ion capacitor, a Li salt compound is preferably used as the electrolyte salt.

The Li salt compound may be a Li salt compound having a large potential window which is generally used in lithium ion capacitors. Examples thereof include $LiBF_4$, $LiPF_6$, $LiClO_4$, $LiCF_3SO_3$, $LiN(CF_3SO_2)_2$, $LiN(C_2F_6SO_2)_2$ and $LiN[CF_3SC(C_2F_6SO_2)_3]_2$. The Li salt compound is not limited to these examples. These may be used alone or in combination of at least two.

For example, in the case of the lithium ion capacitor, the electrolyte salt compound in the present invention may consist of the Li salt compound and the ambient temperature molten salt. In the case of an electrical double-layer capacitor, the electrolyte salt compound may consist of only the ambient temperature molten salt.

In the present invention, in the case of the lithium ion capacitor, the amount of the total of the Li salt compound and the ordinary temperature molten salt relative to a polyether copolymer is preferably 1 to 120 parts by weight of electrolyte salt, more preferably 3 to 90 parts by weight, based on 10 parts by weight of the polyether copolymer. In the case of the electrical double-layer capacitor, the amount of the ordinary temperature molten salt is preferably 1 to 300 parts by weight, more preferably 5 to 200 parts by weight, based on 10 parts by weight of the polyether copolymer.

In the present invention, an aprotic organic solvent may be added to the electrolyte composition. A viscosity at the time of capacitor production and performances of the capacitor can be adjusted by combining the electrolyte composition of the present invention with the aprotic organic solvent.

The aprotic organic solvent is preferably aprotic nitriles, ethers and esters. Specific examples of the aprotic organic solvent include acetonitrile, propylene carbonate, gamma-butyrolactone, butylene carbonate, vinyl carbonate, ethylene carbonate, dimethyl carbonate, ethylmethyl carbonate, diethyl carbonate, methyl monoglyme, methyl diglyme, methyl triglyme, methyl tetraglyme, ethyl monoglyme, ethyl diglyme, ethyl triglyme, ethyl methyl monoglyme, butyl diglyme, 3-methyl-2-oxazolidone, tetrahydrofuran, 2-methyltetrahydrofuran, 1,3-dioxolane, 4,4-methyl-1,3-dioxolane, methyl formate, methyl acetate and methyl propionate. Among them, preferable are propylene carbonate, gamma-butyrolactone, butylene carbonate, vinyl carbonate, ethylene carbonate, methyl triglyme, methyl tetraglyme, ethyl triglyme and ethylmethyl monoglyme. A mixture of at least two may be used.

A method of mixing, for example, the ambient temperature molten salt and the necessary electrolyte salt compound with the polyether copolymer is not particularly limited. Examples of the mixing method include:

a method of immersing and impregnating the polyether copolymer in a solution comprising, for example, the ambient temperature molten salt and the necessary electrolyte salt compound for a long time;

a method of mechanically mixing, for example, the ambient temperature molten salt and the necessary electrolyte salt compound with the polyether copolymer;

a method mixing, for example, the ambient temperature molten salt and the necessary electrolyte salt compound with the polyether copolymer by dissolving the polyether copolymer and the electrolyte salt compound in the ambient temperature molten salt; and a method of mixing, for example, the ambient temperature molten salt and the necessary electrolyte salt compound, after dissolving the polyether copolymer in another solvent. The other solvent in the case of production using the other solvent include various polar solvents such as tetrahydrofuran, acetone, acetonitrile, dimethylformamide, dimethyl sulfoxide, dioxane, methyl ethyl ketone and methyl isobutyl ketone, which may be used alone or in combination of at least two. In the case that the polyether copolymer is crosslinked, the other solvents can be removed, before, during or after the crosslinking.

The electrolyte composition may have a viscosity of at least 8 Pa·s in a service condition, in order to maintain the state that the gel of the electrolyte composition does not flow in such extent that a separator is not required, according to an embodiment of the present invention.

The electrolyte composition of the present invention may contain at least one substance selected from the group consisting of inorganic fine particles, resin fine particles, and resin superfine fibers, in order to increase strength of the gel electrolyte after the crosslinking, and/or in order to improve ionic permeability.

The inorganic fine particles are electrochemically stable and electrically insulative. Examples of the inorganic fine particles include fine particles of inorganic oxides such as iron oxide (for example, $Fe_xO_y$; FeO and $Fe_2O_3$), $SiO_2$, $Al_2O_3$, $TiO_2$, $BaTiO_2$ and $ZrO_2$; fine particles of inorganic nitrides such as aluminum nitride and silicon nitride; fine particles of poorly soluble ionic crystals such as calcium fluoride, barium fluoride, barium sulfate and calcium carbide; fine particles of covalent bond crystals such as silicon and diamond; and fine particles of clay such as montmorillonite. Herein, the above-mentioned fine particles of inorganic oxides may be fine particles of mineral origin substances such as boehmite, zeolite, apatite, kaolin, mullite, spinel, olivine and mica, or artificial substances therefrom. The inorganic particles may be particles which have electric insulation by covering a surface of electrically conductive materials illustrated by an electrically conductive oxide such as a metal, $SnO_2$ and tin-indium oxide (ITO), and a carbonaceous material such as carbon black and graphite with an electrically insulative material (for example, the above-mentioned inorganic oxides).

The resin fine particles may be particles which have thermal resistance and electric insulation and are stable to, for example, the ambient temperature molten salt. The resin fine particles are preferably the particles comprising electrochemically stable substance wherein oxidation-reduction cannot be easily carried out in an operating voltage range of the capacitor. Examples of the resin fine particles include a resin crosslinked material. Specific examples of the resin fine particles include a crosslinked material of at least one resin selected from the group consisting of a styrene resin [for example, polystyrene (PS)], a styrene butadiene rubber (SBR), an acrylic resin [for example, polymethyl methacrylate (PMMA)], polyalkylene oxide [for example, polyethylene oxide (PEO)], a fluororesin [for example, polyvinylidene fluoride (PVDF)] and derivatives therefrom; a urea resin; and a polyurethane. The resin fine particles may be one of the above above-mentioned resins alone or in combination of at least two of the above above-mentioned resins. The organic fine particles may contain various conventionally known additives, for example, an antioxidant, added to the resin, if needed.

Examples of the resin superfine fibers include fibers comprising a resin such as polyimide, polyacrylonitrile, Aramid, polypropylene (PP), chlorinated PP, PEO, polyethylene (PE), cellulose, a cellulosic derivative, polysulfone, polyethersulfone, polyvinylidene fluoride (PVDF) and a vinylidene fluoride/hexafluoropropylene copolymer; and a derivative of these resins.

Fine particles of $Al_2O_3$, $SiO_2$, boehmite or PMMA (crosslinked PMMA) are particularly preferably used, among the inorganic fine particles, the resin fine particles and the resin superfine particles.

The shape of the inorganic fine particles and the resin fine particles may be any of a sphere shape, a plate shape, and a polyhedral shape other than the plate shape.

A suitable thickness of the gel electrolyte layer is needed, since a thinner thickness of the gel electrolyte layer is advantageous because of a larger capacity of the electrochemical capacitor, but electrodes may have a short-circuit if the thickness is too thin. The thickness of the gel electrolyte layer is specifically 1 to 50 micrometers, preferably 3 to 30 micrometers, more preferably 5 to 20 micrometers.

(Method of Producing Electrode)

The electrode for the electrochemical capacitor according to the present invention preferably comprises an electrical collector used as an electrode substrate, the active material of the positive electrode or the negative electrode, the electrically conductive aid which effectively delivers and receives ions to and from the electrolyte layer, and the binder for fixing the positive electrode active materials or negative electrode active materials to the electrical collector used as the electrode substrate. The electrode for electrochemical capacitor can be produced by forming the electrode composition for electrochemical capacitor comprising the active material, the electrically conductive aid, and the binder on the electrical collector used as the electrode substrate.

Examples of the method of producing the electrode include:

a method of laminating, on the electrical collector, the electrode composition for electrochemical capacitor which is molded into a sheet shape (a kneading sheet molding method);

a method to coating a paste-state electrode composition for electrochemical capacitor on the electrical collector and drying (a wet molding method); and a method of preparing composite particles of the electrode composition for electrochemical capacitor, molding a sheet on the electrical collector and subjecting the sheet to a roll press (a dry molding method). Among them, the wet molding method and the dry molding method are preferable, and the wet molding method is more preferable.

(Electrical Collector)

Examples of a material of the electrical collector used for the electrode for electrochemical capacitor of the present invention include a metal, carbon, an electrically conductive polymer. The metal is preferably used. Examples of the metal used for the electrical collector include aluminum, platinum, nickel, tantalum, titanium, stainless steel, copper and other alloys. Copper, aluminum, and an aluminum alloy are preferable for the electrical collector used for the electrode for electrochemical capacitor in view of electrical conductivity and voltage resistance.

Examples of the shape of the electrical collector used for the electrode for electrochemical capacitor of the present invention include electrical collectors such as a metallic foil and a metal edged foil; and electrical collectors having penetrating holes such as an expanded metal, a punching metal and a mesh metal. The electrical collectors having penetrating holes are preferable in view that a diffusion resistance of the electrolyte ion can be decreased and an output density of the electrochemical capacitor can be improved. The expanded metal and the punching metal are particularly preferable in view that electrode strength is further excellent.

A ratio of the holes of the electrical collector having penetrating holes which is preferably used for the electrode for electrochemical capacitor of the present invention is preferably 10 to 80% by area, more preferably 20 to 60% by area, still more preferably 30 to 50% by area. When the ratio of the penetrating holes is in this range, the diffusion resistance of the electrolyte solution is decreased and the internal resistance of the lithium ion capacitor is decreased.

The thickness of the electrical collector used for the electrode for electrochemical capacitor of the present invention is preferably 5 to 100 micrometers, more preferably 10 to 70 micrometers, particularly preferably 20 to 50 micrometers.

(Active Material)

An allotrope of carbon is usually used as the electrode active material used for the positive electrode for electrochemical capacitor of the present invention. The electrode active material which is usually used in the electrical double-layer capacitors can be widely used. Specific examples of the carbon allotrope include an activated carbon, a polyacene (PAS), a carbon whisker and a graphite. Powder or fiber of these materials can be used. Among them, the activated carbon is preferred. Examples of the activated carbon include activated carbons prepared from a raw material such as a phenol resin, a rayon, an acrylonitrile resin, a pitch and a coconut husk. In case of using a combination of carbon allotropes, it is possible to use a combination of at least two carbon allotropes having different average particle sizes or particle size distributions. In addition to the above-mentioned substances, examples of the electrode active material used for the positive electrode may preferably include a polyacene organic semi-conductor (PAS) having a polyacene skeleton structure wherein an atomic ratio of hydrogen atoms to carbon atoms is 0.50 to 0.05, which is a thermally treated aromatic condensed polymer.

Any of materials which can reversely support the cation can be used as the electrode active material used for the negative electrode for the electrochemical capacitor. Specifically, the electrode active materials used for the negative electrodes of lithium ion secondary batteries may be used widely. Among these, preferable are crystalline carbon materials such as graphite and poorly graphitized carbon, carbon materials such as hard carbon and coke, a polyacene material (PAS) which is also mentioned above as the electrode active material of the positive electrode. These carbon materials and PAS can be obtained by carbonizing, for example, a phenol resin, activating if necessary and then pulverizing.

A shape of the electrode active material used for the electrode composition for electrochemical capacitor is preferably granulated particles. Further, if the shape of the particle is spherical, more high density electrode can be formed for the preparation of the electrode.

A volume-average particle size of the electrode active material used for the electrode composition for electrochemical capacitor is usually 0.1 to 100 µm, preferably 0.5 to 50 µm, more preferably 1 to 20 µm for both positive and negative electrodes. These electrode active materials may be used alone or in combination of at least two.

(Electrically Conductive Aid)

Examples of the electrically conductive aid used for the electrode for electrochemical capacitor of the present invention include particulate or fibrous electrically conductive aids, for example, graphite, an electrically conductive carbon black such as furnace black, acetylene black and ketchen black (registered trademark of AkzoNobel Chemicals B.V.), and carbon fibers. Among these, acetylene black and furnace black are preferable.

A volume-average particle size of the electrically conductive aid used for the electrode composition for electrochemical capacitor of the present invention is preferably smaller than the volume-average particle size of the electrode active material. A range of the volume-average particle size of the electrically conductive aid is usually 0.001 to 10 µm, preferably 0.05 to 5 µm, more preferably 0.01 to 1 µm. When the volume-average particle size of the electrically conductive aid is within this range, high electrically conductive characteristic can be obtained even at a smaller use amount. These electrically conductive aids can be used as alone or in combination of at least two. An amount of the electrically conductive aid is usually 0.1 to 50 parts by weight, preferably 0.5 to 15 parts by weight, more preferably 1 to 10 parts by weight, based on 100 parts by weight of the electrode active material. When the amount of the electrically conductive aid is within this range, a capacity of the electrochemical capacitor, wherein the obtained electrode for electrochemical capacitor is used, can be higher and an internal resistance can be decreased.

(Binder)

Examples of the binder used for the electrode for electrochemical capacitor of the present invention include a nonaqueous binder such as polytetrafluoroethylene (PTFE), polyvinylidene fluoride (PVdF), a fluorine-containing rubber, or a styrene butadiene rubber (SBR) and an aqueous binder such as an acrylic rubber, but the examples are not limited to these.

A glass transition temperature (Tg) of the binder used for the composition of the electrode for electrochemical capacitor of the present invention is preferably 50° C. or below, more preferably −40° C. to 0° C. When the glass transition temperature (Tg) of the binder is within this range, the binding property is excellent, the electrode strength is strong, flexibility is excellent at a small use amount, so that an electrode density can be easily improved by a pressing process at the time of producing the electrode.

A number-average particle size of the binder used for the composition of the electrode for electrochemical capacitor of the present invention is usually 0.0001 to 100 µm, preferably 0.001 to 10 µm, more preferably 0.01 to 1 µm, but there is no particular limitation for the number-average particle size. When the number-average particle size of the binder is within this range, an excellent binding force can be provided to the electrode, even at a small use amount. Herein, the number-average particle size means a number-average particle size calculated as an arithmetic average by measuring sizes of 100 binder particles selected randomly by a transmission electron microscopy photomicrograph. A shape of the particles may be either spherical or heteromorphic. The binder can be used alone or in combination of at least two. An amount of the binder is usually 0.1 to 50 parts by weight, preferably 0.5 to 20 parts by weight, more preferably 1 to 10 parts by weight, based 100 parts by weight of the electrode active material. When the amount of the binder is within this range, an adhesive property between the electrode composition layer and the electrical collector can be maintained properly, a capacity of the electrochemical capacitor can be improved, and an internal resistance can be reduced.

Preferably, in the present invention, the positive electrode and the negative electrode are produced by adding the above-mentioned positive electrode and negative electrode active material, the electrically conductive aid and the binder to a solvent to give a slurry; coating the slurry on the electrical collector sheet; drying the slurry; pressure-jointing them under a pressure of 0 to 5 ton/cm$^2$, particularly 0 to 2 ton/cm$^2$; and calcinating them at 200° C. or more, preferably 250 to 500° C., more preferably 250 to 450° C., for 0.5 to 20 hours, particularly 1 to 10 hours.

In the electrochemical capacitor of the present invention, lithium ions are previously occluded, so-called "doped" into the positive electrode and/or the negative electrode. A means of doping into the positive electrode and/or the negative electrode is not limited. For example, a lithium ion supply source may be physically contacted with the positive electrode or the negative electrode, or an electrochemical doping may be conducted.

The electrochemical capacitor can be produced by coating the electrochemical capacitor electrode composition on the negative electrode or the positive electrode and optionally crosslinking the composition to prepare a film in the form of a transfer sheet, and then piling up the film on the positive electrode or the negative electrode.

The electrochemical capacitor can be produced also by impregnating or injecting, between the negative electrode and the positive electrode, a gel prepared by adding an aprotic organic solvent having a high boiling point and the ambient temperature molten salt to the electrolyte composition.

An example of the method of producing the electrochemical capacitor of the present invention is a method which comprises steps of:

(A) polymerizing 0 to 90% by mol of a monomer represented by the formula (1):

[Formula 10]

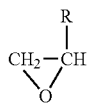

(1)

wherein R is an alkyl group having 1-12 carbon atoms, or —CH$_2$O(CR$^1$R$^2$R$^3$),
in which each of R$^1$, R$^2$ and R$^3$ is a hydrogen atom or —CH$_2$O(CH$_2$CH$_2$O)$_n$R$^4$,
n and R$^4$ is the same or different among R$^1$, R$^2$ and R$^3$,
R$^4$ is an alkyl group having 1-12 carbon atoms, or an aryl group which may have a substituent, and
n is an integer of 0 to 12,
99 to 10% by mol of a monomer represented by the formula (2):

[Formula 11]

(2)

and
0 to 15% by mol of a monomer represented by the formula (3):

[Formula 12]

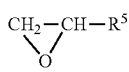

(3)

wherein R$^5$ is a group containing an ethylenically unsaturated group,
to obtain a polyether copolymer,
(B) injecting a composition (an uncrosslinked electrolyte composition) comprising the above-mentioned polyether copolymer, a photoreaction initiator, and an electrolyte salt compound between a negative electrode material and a positive electrode material, and
(C) crosslinking and gelling the above-mentioned injected composition.

In the polymerization step (A), the monomers represented by the above-mentioned formula (1), the formula (2) and the formula (3) are polymerized to obtain the polyether copolymer. The polyether copolymer can be obtained by reacting the monomers at a reaction temperature of 10 to 120° C. with stirring in the presence or absence of a solvent, by using a ring-opening polymerization catalyst, for example, a coordination anion initiator such as a catalyst system based on an organic aluminum, a catalyst system based on organic zinc, an organotin-phosphate ester condensate catalyst system, or an anion initiator such as a potassium alkoxide, diphenylmethyl potassium and potassium hydroxide containing K$^+$ as a counter ion. The coordination anion initiator is preferable in view of a degree of polymerization or properties of the obtained copolymer. Among them, the organotin-phosphate ester condensate catalyst system is particularly preferable in view of easiness of handling.

In the coating step (B), the polyether copolymer, the photoreaction initiator and the electrolyte salt are injected between the negative electrode material and the positive electrode material.

In the coating step (B), the electrolyte composition may be coated on one surface of either the negative electrode material or the positive electrode material. Alternatively the electrolyte composition may be coated on surfaces of both of the negative electrode material or the positive electrode material.

In the crosslinking step (C), the injected electrolyte composition is crosslinked and gelled to form a gel electrolyte layer of the electrolyte composition on the electrode material. The crosslinking can be performed by irradiating with an active energy ray in the presence or absence of an aprotic organic solvent. Specific examples of the active energy ray include electromagnetic waves such as an ultraviolet ray, a visible ray, an infrared ray, X-ray, a gamma ray and a laser beam; and particle rays such as an alpha ray, a beta ray and an electron ray.

The electrochemical capacitor having the constitution of negative electrode material/electrolyte composition/positive electrode material can be obtained by using the electrolyte composition gelled in the crosslinking step (C).

In the present invention, the electrochemical capacitor may be produced by applying an electrolyte composition film onto the electrode material. The electrolyte composition film can be produced by preparing an electrolyte composition, coating the electrolyte composition on a release sheet, crosslinking the electrolyte composition on the release sheet, and peeling-off from the release sheet.

EXAMPLES

Hereinafter, specific embodiments according to the present invention are illustrated by showing the following Examples below. However, the present invention is not limited to the following Examples, without departing from the gist of the present invention.

In the Examples, the following experiments were conducted in an electrochemical capacitor comprising a negative electrode material, a nonaqueous electrolyte and a positive electrode material, in order to compare a capacity and a retention rate of the capacitor.

Synthesis Example (Production of Catalyst for Polyether Copolymerization)

Into a three-necked flask provided with a stirrer, a thermometer and a distillation apparatus, 10 g of tributyltin chloride and 35 g of tributyl phosphate were charged, and heated for 20 minutes at 250° C. with stirring under a nitrogen gas stream to distill off a distillate, and then a solid condensate substance was obtained as a residue. This substance was used as a polymerization catalyst in the following Polymerization Examples.

A composition of the polyether copolymer in terms of monomer was determined according to $^1$H NMR spectrum.

A gel permeation chromatography (GPC) was measured to determine a molecular weight of the polyether copolymer, and a weight-average molecular weight was calculated in terms of a standard polystyrene. The GPC measurement was performed at 60° C. by using RID-6A manufactured by Shimadzu Corp., Shodex KD-807, KD-806, KD-806M and KD-803 columns manufactured by Showa Denko K.K., and DMF as a solvent.

Polymerization Example 1

Into a glass four-necked flask having an internal volume of 3 L which was internally replaced by a nitrogen gas, 1 g of the condensate substance produced in Synthesis Example of catalyst as a polymerization catalyst, 158 g of a glycidyl ether compound (a) adjusted to a water content of 10 ppm or less:

[Formula 13]

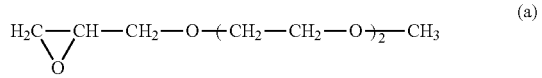

(a)

22 g of allyl glycidyl ether and 1000 g of n-hexane as a solvent were charged, then 125 g of ethylene oxide was added sequentially with monitoring a polymerization conversion of the compound (a) by a gas chromatography. The polymerization temperature at this time was kept at 20° C., and the polymerization reaction was conducted for 10 hours. The polymerization reaction was terminated by adding 1 mL of methanol. After removing a polymer by decantation, the polymer was dried at 40° C. under an ordinary pressure for 24 hours and then at 45° C. under a reduced pressure for 10 hours to obtain 280 g of the polymer. The results of weight-average molecular weight and composition analysis in terms of monomer of the obtained polyether copolymer are shown in Table 1.

Polymerization Example 2

Into a glass four-necked flask having an internal volume of 3 L which was internally replaced by a nitrogen gas, 2 g of the condensate substance produced in Synthesis Example of catalyst as a polymerization catalyst, 50 g of glycidyl methacrylate adjusted to a water content of 10 ppm or less, 1000 g of n-hexane as a solvent, and 0.06 g of ethylene glycol monomethyl ether as a chain transfer agent were charged, then 195 g of ethylene oxide was added sequentially with monitoring a polymerization conversion of glycidyl methacrylate by a gas chromatography. The polymerization reaction was terminated by methanol. After removing a polymer by decantation, the polymer was dried at 40° C. under an ordinary pressure for 24 hours and then at 45° C. under a reduced pressure for 10 hours to obtain 223 g of the polymer. The results of weight-average molecular weight and composition analysis in terms of monomer of the obtained polyether copolymer are shown in Table 1.

Polymerization Example 3

The same operation was repeated to obtain 125 g of a polymer except that 30 g of allyl glycidyl ether, 100 g of ethylene oxide, and 0.02 g of n-butanol were charged to polymerize the monomers in the preparation of Polymerization Example 2. The results of weight-average molecular weight and composition analysis in terms of monomer of the obtained polyether copolymer are shown in Table 1.

Polymerization Example 4

The same operation was repeated to obtain 252 g of a polymer except that 30 g of glycidyl methacrylate, 260 g of ethylene oxide, and 0.08 g of ethylene glycol monomethyl ether were charged to polymerize the monomers in the preparation of Polymerization Example 2. The results of weight-average molecular weight and composition analysis in terms of monomer of the obtained polyether copolymer are shown in Table 1.

TABLE 1

| Copolymer Ingredients (mol %) | Polym. Example 1 | Polym. Example 2 | Polym. Example 3 | Polym. Example 4 |
|---|---|---|---|---|
| Ethylene oxide | 72 | 93 | 90 | 97 |
| Compound (a) | 23 | 0 | 0 | 0 |
| Allyl glycidyl ether | 5 | 0 | 10 | 0 |
| Glycidyl methacrylate | 0 | 7 | 0 | 3 |
| Weight-average molecular weight of copolymer | 1,000,000 | 430,000 | 180,000 | 450,000 |

Example 1

Production of Capacitor Comprising Negative Electrode/Electrolyte Composition 1/Positive Electrode:

<Production 1 of Negative Electrode>

100 parts by weight of a graphite having a volume-average particle size of 4 micrometers as a negative electrode active material, 2 parts by weight in solid content of a 1.5% aqueous solution (manufactured by Daicel Chemical Industries, Ltd.) of sodium carboxymethyl cellulose having a molecular weight of 30,000, 5 parts by weight of acetylene black as an electrically conductive aid, 3 parts by weight in solid content of a 40% aqueous dispersion of a SBR binder having a number-average particle size of 0.15 micrometers, and ion-exchanged water were mixed and dispersed to obtain an electrode coating liquid for negative electrode having a total solid content of 35%.

This electrode coating liquid for negative electrode was coated by a doctor blade method on a copper foil having a thickness of 18 micrometers, preliminarily dried, rolled, and cut so that an electrode had a size of 10 mm×20 mm. A thickness of the electrode was about 50 micrometers. Before the assembly of a cell, the electrode was dried at 120° C. in vacuum for 5 hours.

<Doping of Negative Electrode with Lithium>

The negative electrode produced as above was subjected to the lithium doping as follows: In a dry atmosphere, the negative electrode and a lithium metal foil were stacked, and a very small amount of a 1 mol/L solution of lithium bis(fluorosulfonyl)imide in 1-ethyl-3-methyl imidazolium bis(fluorosulfonyl)imide was injected between the negative electrode and the lithium metal foil, and then a specified amount of lithium ions were occluded into the negative electrode for 10 hours. The doping amount of lithium was set at about 75% of a capacity of the negative electrode.

<Production 1 of Positive Electrode>

Active carbon powder having a volume-average particle size of 8 micrometers which is an alkali-activated activated carbon prepared from a phenol resin as a raw material was used for a positive electrode active material. 100 parts by weight of this positive electrode active material, 2 parts by weight in solid content of a 1.5% aqueous solution (manufactured by Daicel Chemical Industries, Ltd.) of sodium carboxymethyl cellulose having a molecular weight of 30,000 as a dispersant, 5 parts by weight of acetylene black as an electrically conductive aid, 3 parts by weight in solid content of a 40% aqueous dispersion of a SBR binder having a number-average particle size of 0.15 micrometers as a binder, and ion-exchanged water were mixed and dispersed by a disperser to obtain an electrode coating liquid for positive electrode having a total solid content of 30%.

This electrode coating liquid for positive electrode was coated by a doctor blade method on an aluminum foil electrical collector having a thickness of 15 micrometers, preliminarily dried, rolled, and cut so that an electrode had a size of 10 mm×20 mm. A thickness of the electrode was 50 micrometers.

<Production of Electrolyte Composition 1>

10 parts by weight of the copolymer obtained in Polymerization Example 1, 1 part by weight of trimethylolpropane trimethacrylate and 0.2 parts by weight of 2-hydroxy-2-methyl-1-phenyl-propan-1-one photoreaction initiator were dissolved in 90 parts by weight of 1 mol/L solution of lithium bis(fluorosulfonyl)imide in 1-ethyl-3-methyl imidazolium bis(fluorosulfonyl)imide to produce Electrolyte Composition 1.

<Formation of Electrolyte Composition Layer>

The above-mentioned Electrolyte Composition 1 was coated by a doctor blade on the positive electrode sheet obtained in Production 1 of positive electrode to form an electrolyte composition layer having a thickness of 10 micrometers. Then, after drying the electrolyte composition layer, the electrolyte composition layer was crosslinked by irradiating with a high-pressure mercury-vapor lamp (30 mW/cm$^2$) manufactured by GS Yuasa Corporation for 30 seconds in the state that an electrolyte surface is covered with a laminate film, to produce a positive electrode/electrolyte sheet in which the electrolyte composition layer was integrated onto the positive electrode sheet.

The negative electrode sheet doped with lithium was treated in the same manner as in the positive electrode to produce a negative electrode/electrolyte sheet in which the electrolyte composition layer having a thickness of 10 micrometers was integrated on the negative electrode sheet.

<Assembly of Capacitor Cell>

The Lamination covers were removed, and the positive electrode/electrolyte sheet and the negative electrode/electrolyte sheet were attached together in a glove box substituted with an argon gas. The whole was covered with a laminate film to produce a laminate cell-shaped lithium ion capacitor. The completed cell was allowed to stand for about one day until measurements.

Example 2

Production of Capacitor Having Negative Electrode/Electrolyte Composition 2/Positive Electrode:

A negative electrode and a positive electrode were produced in the same manner as in Example 1.

<Production of Electrolyte Composition 2>

10 parts by weight of the copolymer obtained in Polymerization Example 1, 0.2 parts by weight of 2-hydroxy-2-methyl-1-phenyl-propan-1-one photoreaction initiator and 0.05 parts by weight of 2-benzyl-2-dimethylamino-1-(4-morpholinophenyl)-butanone-1 were dissolved in 90 parts by weight of 1 mol/L solution of lithium bis(fluorosulfonyl)imide in 1-ethyl-3-methyl imidazolium bis(fluorosulfonyl)imide to produce Electrolyte Composition 2.

<Formation of Electrolyte Composition Layer>

The above-mentioned Electrolyte Composition 2 was coated by a doctor blade on the positive electrode sheet obtained in Production 1 of positive electrode to form an electrolyte composition layer having a thickness of 10 micrometers. Then, after drying the electrolyte composition layer, the electrolyte composition layer was crosslinked by irradiating with a high-pressure mercury-vapor lamp (30 mW/cm$^2$) manufactured by GS Yuasa Corporation for 30 seconds in the state that an electrolyte surface is covered with a laminate film, to produce a positive electrode/electrolyte sheet in which the electrolyte composition layer was integrated onto the positive electrode sheet. The negative electrode sheet was treated in the same manner as in the positive electrode to produce a negative electrode/electrolyte sheet in which the electrolyte composition layer having a thickness of 10 micrometers was integrated on the negative electrode sheet.

The negative electrode sheet doped with lithium was treated in the same manner as in the positive electrode to produce a negative electrode/electrolyte sheet in which the electrolyte composition layer having a thickness of 10 micrometers was integrated on the negative electrode sheet.

<Assembly of Capacitor Cell>

Lamination covers were removed, and the positive electrode/electrolyte sheet and the negative electrode/electrolyte sheet were attached together in a glove box substituted with an argon gas. The whole was covered with a laminate film to produce a laminate cell-shaped lithium ion capacitor. The completed cell was allowed to stand for about one day until measurements.

Example 3

Production of Capacitor Having Negative Electrode/Electrolyte Composition 3/Positive Electrode:

A negative electrode and a positive electrode were produced in the same manner as in Example 1.

<Production of Electrolyte Composition 3>

10 parts by weight of the copolymer obtained in Polymerization Example 2, 0.2 parts by weight of 1-[4-(2-hydroxyethoxy)phenyl]-2-hydroxy-2-methyl-1-propan-1-one photoreaction initiator, 0.1 parts by weight of 2-benzyl-2-dimethylamino-1-(4-morpholinophenyl)-butanone-1 and 3 parts by weight of resin fine particles (MZ-10HN manufactured by Soken Chemical & Engineering Co., Ltd.) were dissolved in 90 parts by weight of 1 mol/L solution of lithium bis(fluorosulfonyl)imide in 1-ethyl-3-methyl imidazolium bis(fluorosulfonyl)imide to produce Electrolyte Composition 3.

<Formation of Electrolyte Composition Layer>

The above-mentioned Electrolyte Composition 3 was coated by a doctor blade on the positive electrode sheet obtained in Production 1 of positive electrode to form an electrolyte composition layer having a thickness of 15 micrometers. Then, after drying the electrolyte composition layer, the electrolyte composition layer was crosslinked by irradiating with a high-pressure mercury-vapor lamp (30 mW/cm$^2$) manufactured by GS Yuasa Corporation for 30 seconds in the state that an electrolyte surface is covered with a laminate film, to produce a positive electrode/electrolyte sheet in which the electrolyte composition layer was integrated onto the positive electrode sheet.

The negative electrode sheet doped with lithium was treated in the same manner as in the positive electrode to produce a negative electrode/electrolyte sheet in which the electrolyte composition layer having a thickness of 10 micrometers was integrated on the negative electrode sheet.

<Assembly of Capacitor Cell>

Lamination covers were removed, and the positive electrode/electrolyte sheet and the negative electrode/electrolyte sheet were attached together in a glove box substituted with an argon gas. The whole was covered with a laminate film to produce a laminate cell-shaped lithium ion capacitor. The completed cell was allowed to stand for about one day until measurements.

Example 4

Production of Capacitor Having Negative Electrode/Electrolyte Composition 4/Positive Electrode:

A negative electrode and a positive electrode were produced in the same manner as in Example 1.

<Production of Electrolyte Composition 4>

10 parts by weight of the copolymer obtained in Polymerization Example 3, 0.3 parts by weight of 1-[4-(2-hydroxyethoxy)phenyl]-2-hydroxy-2-methyl-1-propan-1-one photoreaction initiator and 2 parts by weight of resin fine particles (EPOSTAR MA1010 manufactured by NIPPON SHOKUBAI Co., Ltd.) were dissolved in 90 parts by weight of 1 mol/L solution of lithium bis(fluorosulfonyl)imide in 1-ethyl-3-methyl imidazolium bis(fluorosulfonyl)imide to produce Electrolyte Composition 4.

<Formation of Electrolyte Composition Layer>

The above-mentioned Electrolyte Composition 4 was coated by a doctor blade on the positive electrode sheet obtained in Production 1 of positive electrode to form an electrolyte composition layer having a thickness of 15 micrometers. Then, after drying the electrolyte composition layer, the electrolyte composition layer was crosslinked by irradiating with a high-pressure mercury-vapor lamp (30 mW/cm$^2$) manufactured by GS Yuasa Corporation for 30 seconds in the state that an electrolyte surface is covered with a laminate film, to produce a positive electrode/electrolyte sheet in which the electrolyte composition layer was integrated onto the positive electrode sheet.

The negative electrode sheet doped with lithium was treated in the same manner as in the positive electrode to produce a negative electrode/electrolyte sheet in which the electrolyte composition layer having a thickness of 10 micrometers was integrated on the negative electrode sheet.

<Assembly of Capacitor Cell>

The positive electrode/electrolyte sheet and the negative electrode/electrolyte sheet were attached together in a glove box substituted with an argon gas. The whole was covered with a laminate film to produce a laminate cell-shaped lithium ion capacitor. The completed cell was allowed to stand for about one day until measurements.

Example 5

Production of Capacitor Having Negative Electrode/Electrolyte Composition 5/Positive Electrode:

A negative electrode and a positive electrode were produced in the same manner as in Example 1.

<Production of Electrolyte Composition 5>

10 parts by weight of the copolymer obtained in Polymerization Example 4, 0.2 parts by weight of 1-[4-(2-hydroxyethoxy)phenyl]-2-hydroxy-2-methyl-1-propan-1-one photoreaction initiator, 0.15 parts by weight of 2-(dimethylamino)-2-[(4-methylphenyl)methyl]-1-[4-(4-morphonyl)phenyl]-1-butanone and 4 parts by weight of silica fine particles (HIPRESICA FQ8μ manufactured by Ube-Nitto Kasei Co., Ltd.) were dissolved in 90 parts by weight of 1 mol/L solution of lithium bis(fluorosulfonyl)imide in 1-ethyl-3-methyl imidazolium bis(fluorosulfonyl)imide to produce Electrolyte Composition 5.

<Formation of Electrolyte Composition Layer>

The above-mentioned Electrolyte Composition 5 was coated by a doctor blade on the positive electrode sheet obtained in Production 1 of positive electrode to form an electrolyte composition layer having a thickness of 15 micrometers. Then, after drying the electrolyte composition layer, the electrolyte composition layer was crosslinked by irradiating with a high-pressure mercury-vapor lamp (30 mW/cm$^2$) manufactured by GS Yuasa Corporation for 30 seconds in the state that an electrolyte surface is covered with a laminate film, to produce a positive electrode/electrolyte sheet in which the electrolyte composition layer was integrated onto the positive electrode sheet.

The negative electrode sheet doped with lithium was treated in the same manner as in the positive electrode to produce a negative electrode/electrolyte sheet in which the electrolyte composition layer having a thickness of 10 micrometers was integrated on the negative electrode sheet.

<Assembly of Capacitor Cell>

The positive electrode/electrolyte sheet and the negative electrode/electrolyte sheet were attached together in a glove box substituted with an argon gas. The whole was covered with a laminate film to produce a laminate cell-shaped lithium ion capacitor. The completed cell was allowed to stand for about one day until measurements.

Comparative Example 1

Production of Capacitor Having Negative Electrode/Electrolyte Composition 6/Positive Electrode:

A negative electrode and a positive electrode were produced in the same manner as in Example 1.

<Production of Electrolyte Composition 6>

10 parts by weight of the copolymer obtained in Polymerization Example 1, 1 part by weight of trimethylolpropane trimethacrylate and 0.2 parts by weight of benzophenone photoreaction initiator were dissolved in 90 parts by weight of 1 mol/L solution of lithium bis(fluorosulfonyl)imide in 1-ethyl-3-methyl imidazolium bis(fluorosulfonyl)imide to produce Electrolyte Composition 6.

<Formation of Electrolyte Composition Layer>

The above-mentioned Electrolyte Composition 6 was coated by a doctor blade on the positive electrode sheet obtained in Production 1 of positive electrode to form an electrolyte composition layer having a thickness of 10 micrometers. Then, after drying the electrolyte composition layer, the electrolyte composition layer was crosslinked by irradiating with a high-pressure mercury-vapor lamp (30 mW/cm$^2$) manufactured by GS Yuasa Corporation for 30 seconds in the state that an electrolyte surface is covered with a laminate film, to produce a positive electrode/electrolyte sheet in which the electrolyte composition layer was integrated onto the positive electrode sheet.

The negative electrode sheet doped with lithium was treated in the same manner as in the positive electrode to produce a negative electrode/electrolyte sheet in which the electrolyte composition layer having a thickness of 10 micrometers was integrated on the negative electrode sheet.

<Assembly of Capacitor Cell>

The positive electrode/electrolyte sheet and the negative electrode/electrolyte sheet were attached together in a glove box substituted with an argon gas. The whole was covered with a laminate film to produce a laminate cell-shaped lithium ion capacitor. The completed cell was allowed to stand for about one day until measurements.

<Evaluation of Properties of Gel Electrolyte>

The coatability, the liquid retention and the film strength at a stage of forming a gel electrolyte were evaluated for the capacitor cells prepared in the above.

Evaluation methods are as follows:
Evaluation Methods

An electrolyte was coated and photo-cured, then a cover film was removed and a surface state was observed.
Coatability
  Good: Electrolyte is uniformly formed to be even
  Bad: Electrolyte is slightly non-uniformly formed to be uneven
Liquid Retention
  Good: Electrolyte solution is not out of surface of electrolyte
  Bad: Electrolyte solution is not out initially, but electrolyte is out of surface of electrolyte with time.
Film Strength
  Film strength was determined by evaluating an appearance and measuring a thickness after coating a dispersion on a measurement subject and drying by a warm air.
  Good: Even if pushed lightly, electrolyte does not come out.
  Bad: If pushed lightly, electrolyte will come out in a very small amount.

The evaluation results are shown in Table 2.

TABLE 2

| | Coatability | Liquid retention | Film strength |
|---|---|---|---|
| Example 1 | Good | Good | Good |
| Example 2 | Good | Good | Good |
| Example 3 | Good | Good | Good |
| Example 4 | Good | Good | Good |
| Example 5 | Good | Good | Good |
| Com. Example 1 | Good | Bad | Bad |

<Electrochemical Evaluation of Capacitor Cell>

Electrochemical evaluation was performed for the above-mentioned laminate cell.

The discharge capacity is a discharge capacity at a 5th cycle when a constant current charge was carried out until 4.0V at a predetermined electric current, and a constant current discharge was carried out until 2.0 V at the same electric current as the charge. By taking that an electric current at which the cell can discharge a cell capacity for 1 hour is a standard (1C), the charge/discharge current was set to be 1C and 100C (in which the charge/discharge is carried out at an electric current value 100 times as high as a 1C rate). Table 2 shows "discharge capacity" which is a discharge capacity at a 5th cycle measured at a charge/discharge current of 1C. The "discharge capacity retention rate at 100C relative to 1C" was calculated by the following equation. Table 3 shows results of the discharge capacity retention rate.

Discharge capacity retention rate at 100C relative to
1C(%)=(5th cycle discharge capacity at 100C)/
(5th cycle discharge capacity at 1C)×100

In addition, a cycle test was done at 10C. In the charge/discharge cycle test, the charge/discharge was conducted for 10000 cycles wherein 1 cycle is that a constant current charge was carried out until 4.0V at 10C, and a constant current discharge was carried out until 2.0 V at 10C. Table 3 shows results of a capacity retention rate which is a ratio of a discharge capacity after 10000 cycles relative to an initial discharge capacity.

Each measurement was performed at 25° C.

TABLE 3

| | Discharge capacity (mAh) | Discharge capacity retention rate at 100 C relative to 1 C (%) | Capacity retention rate after 10000 cycles at 10 C (%) |
|---|---|---|---|
| Example 1 | 1.15 | 87 | 95 |
| Example 2 | 1.21 | 87 | 95 |
| Example 3 | 1.21 | 85 | 96 |
| Example 4 | 1.10 | 88 | 95 |
| Example 5 | 1.23 | 87 | 96 |
| Com. Example 1 | 0.96 | 82 | 89 |

Table 3 shows that, in Examples 1 to 5, the discharge capacity is high, the discharge capacity retention rate at 100C is high, and the capacity retention rate after 10000 cycles is also high. This seems to be because stable characteristics are obtained even if a separator is not used.

INDUSTRIAL APPLICABILITY

Since the electrochemical capacitor of the present invention has high capacity, excellent charge/discharge characteristics and excellent safety and reliability, the electrochemical capacitor can be used as an application range from a small capacitor of a mobile phone or a note-type personal computer to a stationary-type capacitor or a large-sized capacitor for vehicle.

The invention claimed is:

1. An electrochemical capacitor comprising:
   a negative electrode,
   a gel electrolyte composition which comprises an electrolyte salt and a gel of a crosslinked polyether copolymer having ethyleneoxide units, and
   a positive electrode,
   wherein a photoreaction initiator which crosslinks the polyether copolymer is an alkyl phenone photoreaction initiator, and
   wherein a thickness of a gel electrolyte composition layer comprising the electrolyte salt and the polyether copolymer having ethyleneoxide units, which is prepared by crosslinking and gelling, is 5 to 20 micrometers.

2. The electrochemical capacitor according to claim 1, wherein the electrolyte composition contains an ambient temperature molten salt as the electrolyte salt.

3. The electrochemical capacitor according to claim 1, wherein the polyether copolymer having ethyleneoxide units comprises:
   0 to 90% by mol of a repeating unit represented by the formula (A):

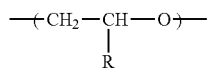
   (A)

wherein R is an alkyl group having 1-12 carbon atoms, or —CH$_2$O(CR$^1$R$^2$R$^3$),
   in which each of R$^1$, R$^2$ and R$^3$ is a hydrogen atom or —CH$_2$O(CH$_2$CH$_2$O)$_n$R$^4$,
   n and R$^4$ are the same or different among R$^1$, R$^2$ and R$^3$,
   R$^4$ is an alkyl group having 1-12 carbon atoms, and
   n is an integer of 0 to 12,
   99 to 10% by mol of a repeating unit represented by formula (B):

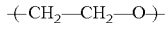
   (B)

and,
   0 to 15% by mol of a repeating unit represented by the formula (C):

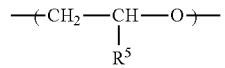
   (C)

wherein R$^5$ is a group containing an ethylenically unsaturated group.

4. The electrochemical capacitor according to claim 1, wherein the alkyl phenone photoreaction initiator is a mixture of a hydroxyalkyl phenone compound and an amino alkyl phenone compound.

5. The electrochemical capacitor according to claim 1, wherein an addition amount of the photoreaction initiator is 0.1 to 10 parts by weight, based on 100 parts by weight of the polyether copolymer.

6. The electrochemical capacitor according to claim 1, wherein the negative electrode comprises a mixture of a negative electrode active material, an electrically conductive aid and a binder, and the negative electrode active material is a graphite or an activated carbon.

7. The electrochemical capacitor according to claim 1, wherein the negative electrode is doped with lithium.

8. The electrochemical capacitor according to claim 1, wherein the positive electrode comprises a mixture of a positive electrode active material, an electrically conductive aid and a binder, and the positive electrode active material is an activated carbon.

9. A method of producing an electrochemical capacitor comprising steps of:
   crosslinking and gelling an electrolyte salt and a polyether copolymer having ethyleneoxide units in the presence of an alkyl phenone photoreaction initiator, to obtain a gel electrolyte composition, and
   connecting a positive electrode and a negative electrode to the gel electrolyte composition, wherein the gel electrolyte composition is a layer having a thickness of 5 to 20 micrometers.

* * * * *